United States Patent [19]

Stoet

[11] Patent Number: 4,788,451
[45] Date of Patent: Nov. 29, 1988

[54] AC VOLTAGE STABILIZER EASILY CONVERTIBLE INTO UNINTERRUPTIBLE POWER SUPPLY (UPS)

[76] Inventor: Hindrik Stoet, Laan van Leeuwesteijn 58, Voorburg, Netherlands

[21] Appl. No.: 94,332

[22] Filed: Sep. 8, 1987

Related U.S. Application Data

[63] Continuation-in-part of Ser. No. 670,960, Nov. 13, 1984, abandoned.

[30] Foreign Application Priority Data

Mar. 14, 1983 [NL] Netherlands .................... 8300923
Mar. 14, 1984 [WO] World Int. Prop. O. .............. PCT/NL84/00012

[51] Int. Cl.⁴ .............................................. H02J 9/00
[52] U.S. Cl. ..................................... 307/66; 307/46; 307/48; 363/24; 363/26
[58] Field of Search .............. 307/64, 66, 44, 46, 307/48, 87; 363/37, 41, 134, 24–26, 133; 323/244

[56] References Cited

U.S. PATENT DOCUMENTS

| | | | |
|---|---|---|---|
| 3,833,817 | 9/1974 | Patel | 307/66 |
| 4,087,697 | 5/1978 | Johnson | 307/66 |
| 4,311,920 | 1/1982 | Smollinger | 307/66 |
| 4,404,472 | 9/1983 | Steigerwald | 307/46 |
| 4,494,178 | 1/1985 | Ishima | 363/21 |
| 4,525,774 | 6/1985 | Kino et al. | 363/17 |
| 4,535,399 | 8/1985 | Szepesi | 363/41 |
| 4,564,767 | 1/1986 | Charych | 307/66 |

FOREIGN PATENT DOCUMENTS 609115  5/1978  U.S.S.R. ..................... 363/26

Primary Examiner—A. D. Pellinen
Assistant Examiner—Derek S. Jennings
Attorney, Agent, or Firm—Peter L. Michaelson

[57] ABSTRACT

An electronic AC voltage stabilizer using a class B amplifier output stage which is fed by a full-wave rectified sinewave voltage. The input voltage to (the phase inverter of) the class B amplifier output stage is kept in phase with the aforesaid sinewave voltage, which causes the power losses in the output stage to be very low. As compared to other electronic AC stabilizers, the apparatus according to the invention offers high efficiency and simplicity. The AC stabilizer can easily be converted into a true uninterruptible power supply (UPS) by adding a battery which through a battery interface circuit connects the battery voltage, after it has been appropriately converted into a full wave rectified sinewave voltage, to the push pull amplifier output stage when a power network fails.

12 Claims, 4 Drawing Sheets

BLOCK DIAGRAM OF AC STABILIZER WITH UPS OPTION

OUTPUT STAGE FED BY
FILTERED DC VOLTAGE

POWER LOSS $P_t$ IN
TRANSISTOR DURING HALF CYCLE

OUTPUT STAGE FED BY
BUBBLE VOLTAGE

POWER LOSS IN
TRANSISTOR FED BY
BUBBLE VOLTAGE

DISTORTED BUBBLE VOLTAGE
AND "CLEAN"
TRANSFORMER VOLTAGE

BUBBLE VOLTAGE
WITH THRESHOLD LEVEL

BLOCK DIAGRAM OF AC
STABILIZER WITH UPS OPTION

CONVERSION OF BATTERY-
VOLTAGE INTO BATTERY BUBBLE

RELATION BETWEEN NETWORK BUBBLE $V_S$ AND BATTERY BUBBLE $V_{DC}$

PULSE TRAIN DURING HALF CYCLE, BEFORE INTEGRATION

UPS CONFIGURATION WHICH IS INDEPENDENT OF NETWORK FREQUENCY much less than that of the previously described conventional output stage. (See FIGS. 1 and 2.)

AC VOLTAGE STABILIZER EASILY CONVERTIBLE INTO UNINTERRUPTIBLE POWER SUPPLY (UPS)

CROSS REFERENCE TO RELATED APPLICATION

This application is a continuation-in-part application of my co-pending U.S. patent application entitled "AC Voltage Stabilizer Easily Convertible into Uninterruptible Power Supply (UPS)" filed Nov. 13, 1984 and assigned Ser. No. 06/670,960, now abandoned.

BACKGROUND OF THE INVENTION

Of all AC voltage stabilizers commercially available today, the pure electronic AC voltage stabilizer features the most precise and fastest regulation and has the lowest distortion on its output waveform. The conventional electronic AC stabilizer, however, tends to possess a certain complexity, which makes it the most expensive and often also the most inefficient stabilizing means because of substantial power losses inherent in the system. In fact, an overall efficiency as low as 50% is difficult to achieve in practice.

SUMMARY OF THE INVENTION

In accordance with the present invention, an AC stabilizer is provided that supplies stable, "clean" AC power, even when the network that is feeding it is unstable and distorted. This type of stable, sinusoidal voltage is highly recommended for computers and other sorts of sensitive electronic equipment.

The basic part of the apparatus according to the invention is a conventional push pull power amplifier output stage. According to the invention the power is applied to it in a special way. This will become apparent by comparing the conventional push pull output stage with that of the invention, supposing both have a sinusoidal signal applied to the input.

BRIEF DESCRIPTION OF THE DRAWINGS

The teachings of the present invention may be clearly understood by considering the following detailed description in conjunction with the drawing, in which.

DETAILED DESCRIPTION

Figure 1:
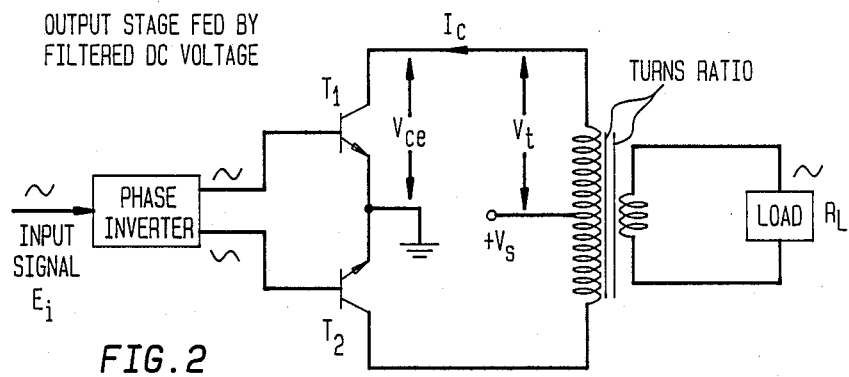
FIG. 1 schematically depicts a typical push-pull power output stage known in the art.
Figure 2:
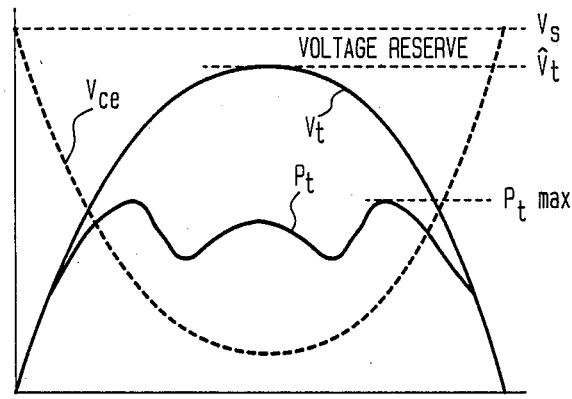
FIG. 2 graphically depicts the waveforms of various voltages ($V_t$, $V_{ce}$ and $V_s$) that appear in the output stage shown in FIG. 1 as well as the waveform of the power ($P_t$) that is dissipated by either of the output transistors appearing in the output stage.

FIG. 1 shows a Class B push pull power output stage receiving a filtered low ripple DC supply voltage $V_s$. The voltage across either transistor $T_1$ or $T_2$ at a certain time will have the form of $V_{ce}$ in FIG. 2, wherein $V_{ce}$ equals the difference between the filtered DC voltage $V_s$ and the voltage $V_t$ across the appropriate half of the output transformer. The other transistor does not conduct during this half cycle.

Assuming a resistive load $R_L$, which is transformed by the primary half of the transformer to $N^2R_L$, the current ($I_C$) through transistors $T_1$ and $T_2$ will have a half sinewave shape and will be proportional to $V_t$, so $I_C = V_t/(N^2R_L)$. The power loss in the transistors during their half cycles is shown by the curve $P_t$ in FIG. 2. $P_t$ max, being the maximum loss over the half cycle, depends on the difference between $V_s$ and $V_t$. This difference is called the voltage reserve. In practice, the maximum dissipation will mostly occur somewhere in the slopes of the half sinewave, even when a non-resistive load is applied to the output stage. With non-resistive, or non-linear loads being applied, the transistor current will no longer be proportional to the transformer voltage, and efficiency will be reduced even more.

Figure 3:
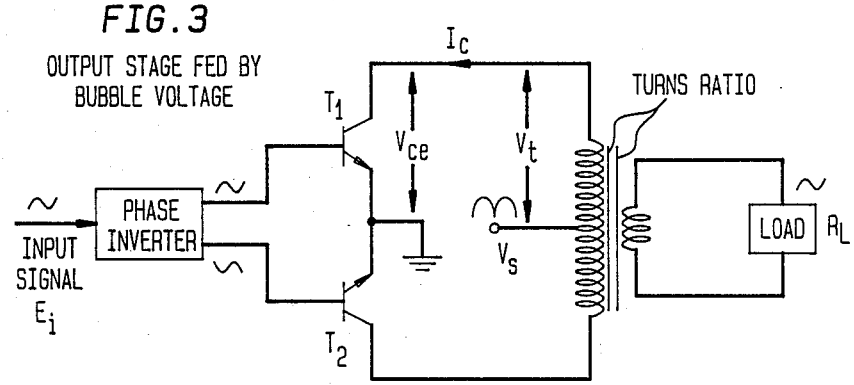
FIG. 3 schematically depicts a push-pull power output stage constructed in accordance with the teachings of the present invention.
Figure 4:
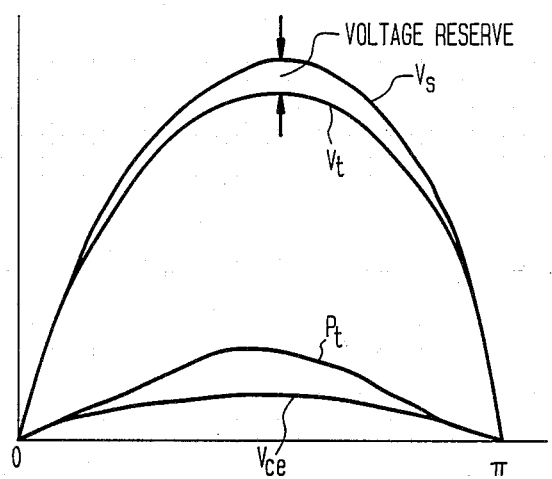
FIG. 4 graphically depicts the waveforms of various voltages ($V_t$, $V_{ce}$ and $V_s$) that appear in the inventive output stage shown in FIG. 3 as well as the waveform of the power ($P_t$) that is dissipated by either of the output transistors appearing in the inventive output stage.

The present invention makes use of a totally different supply voltage to the output stage. This supply voltage is shown in FIG. 4 and has the shape of a series of half sinewaves, hereinafter referred to as "bubble voltage". In FIG. 4, one full cycle of bubble voltage is shown as $V_s$ and the voltage across the transformer half is depicted as $V_t$. The voltage $V_{ce}$ across each transistor, in the Class B output stage shown in FIG. 3, is the difference between $V_s$ and $V_t$ and hence is also a half sinewave. The value of $V_{ce}$ is equal to or less than the voltage reserve and never exceeds this value during the cycle. This means that the power loss in the transistors, especially with non-linear or non-resistive loads, will be much less than that of the previously described conventional output stage. (See FIGS. 1 and 2.)

In theory the efficiency of the above output stage according to the invention and shown in FIG. 3 can be 100% when $V_s$ equals $V_t$, but in practice it will be less than 100% for the following reasons.

Figure 5:
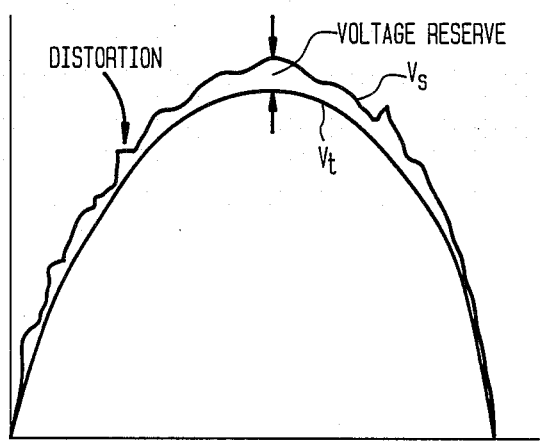
FIG. 5 graphically depicts the waveform of transformer voltage $V_t$ that would occur in the inventive output stage shown in FIG. 3 when the waveform of supply voltage $V_s$ is distorted as shown.

The transistors $T_1$ and $T_2$ in FIG. 3 need the voltage reserve across their collector-emitter junction in order to operate as amplifiers. (See FIG. 5.)

In case the bubble voltage is not an ideal half sinewave, there must be some reserve to ensure that a clean voltage appears across the transformer primary and hence across the load. This means there is some dissipation in the transistors.

Figure 6:
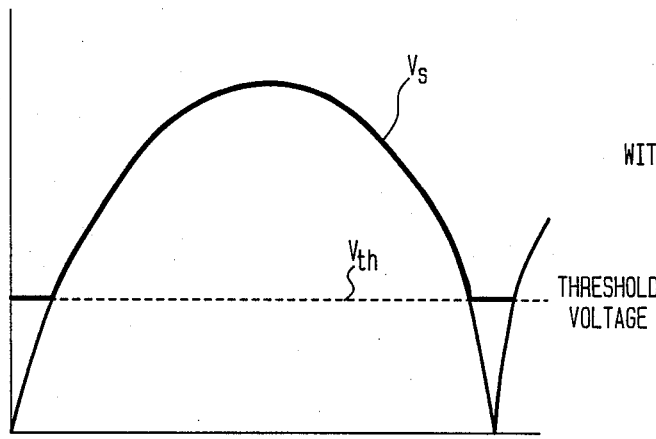
FIG. 6 graphically depicts an alternate waveform for supply voltage $V_s$ for use in conjunction with inventive output stage shown in FIG. 3.

Furthermore, it is recommended to maintain a certain voltage level at the zero crossing of the bubble voltage, $V_s$, in order to prevent reactions of the load back-firing into the output transformer. Therefore, a threshold voltage level, $V_{th}$, is introduced which prevents the bubble voltage from becoming zero, thus ensuring a finite output impedance at what would otherwise be each zero crossing of voltage $V_s$. (See FIG. 6.) These precautions bring the practical efficiency of the output stage with bubble voltage supply down to approximately 85%, which is nevertheless substantially higher than that of the conventional DC-fed output stage shown in FIG. 1.

A major condition for the good operation of the inventive output stage is for the input signal to be equal in frequency and phase to the feeding bubble voltage. To provide this, the signal generator must be phase-locked to the bubble voltage frequency.

Figure 7:
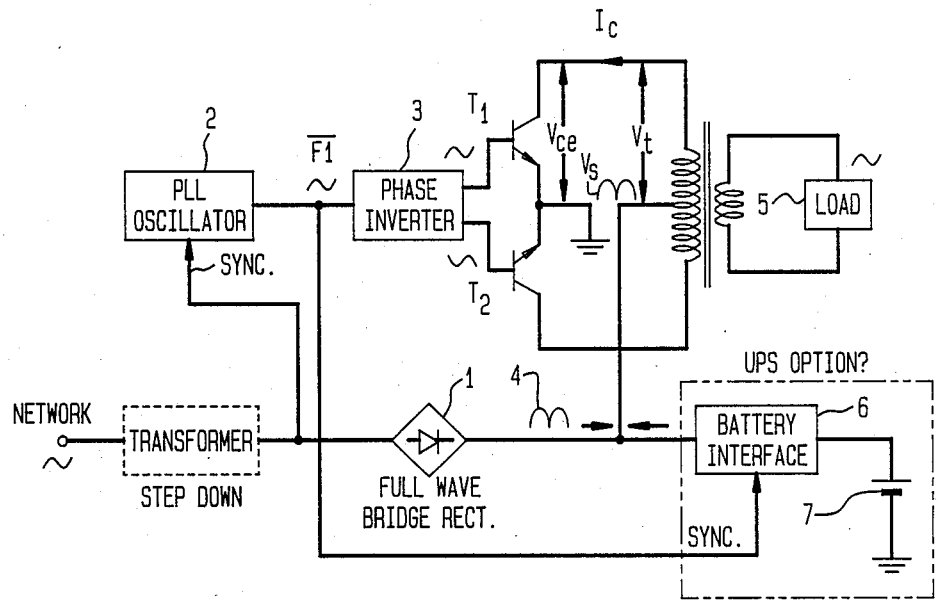
FIG. 7 shows a block diagram of one embodiment of an AC stabilizer and uninterruptible power supply that incorporates the inventive output stage.

The simplest form of such a phase-locked circuit in accordance with the invention is shown in FIG. 7. The bubble voltage is simply created by full wave rectifying a power network voltage (which, if necessary, is first transformed down to an appropriate level by a step-down transformer) by means of bridge 1, without the resulting rectified voltage being smoothed by a filter capacitor. The output signal of bridge 1 is called the network bubble voltage. The oscillator 2 is a phase locked loop oscillator which is locked to the network frequency so that the output signal of the phase inverter 3, being the input signal of the power stage, fits snugly in the bubble voltage 4, resulting in a sinewave output voltage across resistive load 5, which is independent of the value of $V_s$, provided $V_s$ is higher than $V_t$.

Figure 8:
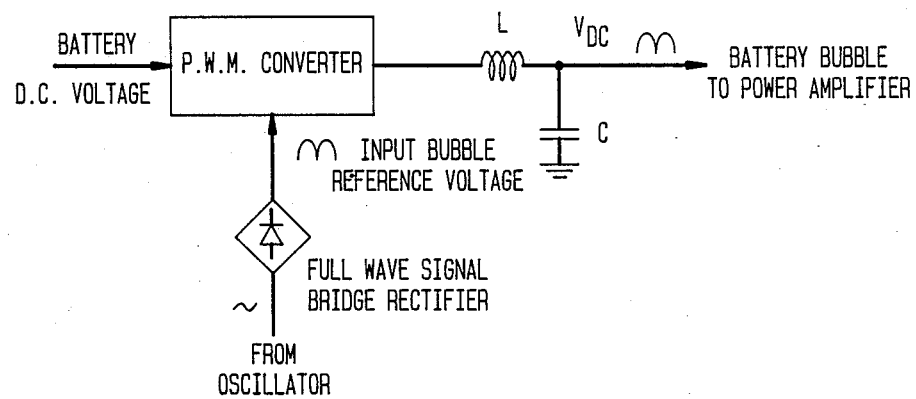
FIG. 8 shows a block diagram of the battery interface shown in FIG. 7.
Figure 9:
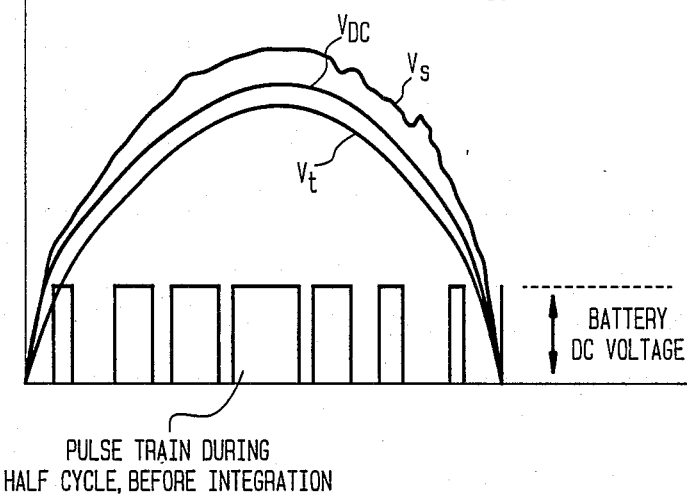
FIG. 9 graphically depicts the waveforms of various voltages that appear in the circuit shown in FIG. 7.

Whenever the level of $V_s$ is less than that of $V_t$, the amplifier output voltage will linearly follow the level of $V_s$. The system is then inoperative, the output signal showing the same distortion as the bubble voltage $V_s$. The AC voltage stabilizer can be transformed into a true UPS—uninterruptible power supply—by adding a battery 7 via a battery interface 6. The battery interface is shown in FIG. 8. Although even a simple semiconductor element—like a transistor or an SCR—can function as an interface to the output stage when the momentary value of the network bubble is too low, the more elaborate way of using a PWM (pulse width modulated) converter is chosen because of the inherent smoother action when switching from network to battery operation and vice versa. The PWM converter is fed from the battery and receives a bubble voltage at its reference point. This bubble voltage is obtained by rectifying the oscillator sinewave signal through a full wave rectifier. The output signal of the PWM converter, the pulse train shown in FIG. 9, is now integrated by an L-C (inductive-capacitive) network, which results in a bubble voltage, $V_{DC}$, that is in phase with the input bubble reference voltage.

The output of the battery interface is the battery bubble voltage, $V_{DC}$, which is in phase with the network bubble voltage, and which is capable of supplying the necessary current to the amplifier output stage.

The peak value of the battery bubble voltage $V_{DC}$ will be equal to the minimum value of the network bubble voltage (level at low network voltage). (See FIG. 9.) As soon as $V_s$ becomes too low because of low network voltage and reaches the value of $V_{DC}$, the battery bubble $V_{DC}$ will take over, not affecting $V_t$, which means that the output voltage of the power amplifier remains constant. The battery has taken over and delivers its current to the power amplifier through the battery interface. The difference in voltage between $V_{DC}$ and $V_t$ will be as small as possible ensuring maximum efficiency during battery operation. During network operation the value of $V_s$, which equals the network bubble voltage, is relevant and the difference in voltage between $V_s$ and $V_t$ is a measure for the losses in the amplifier output stage. In the case of a high network voltage, the efficiency of the power amplifier is lower, although still considerably higher than that of the conventional power amplifier earlier described. A limitation of the above described AC regulator/UPS, which makes use of the network bubble voltage, lies in need to synchronize this voltage to the network frequency. Upon return from battery operation to network operation, this will cause a slight output frequency deviation during frequency locking, which may disturb certain synchronous motor loads.

Figure 10:
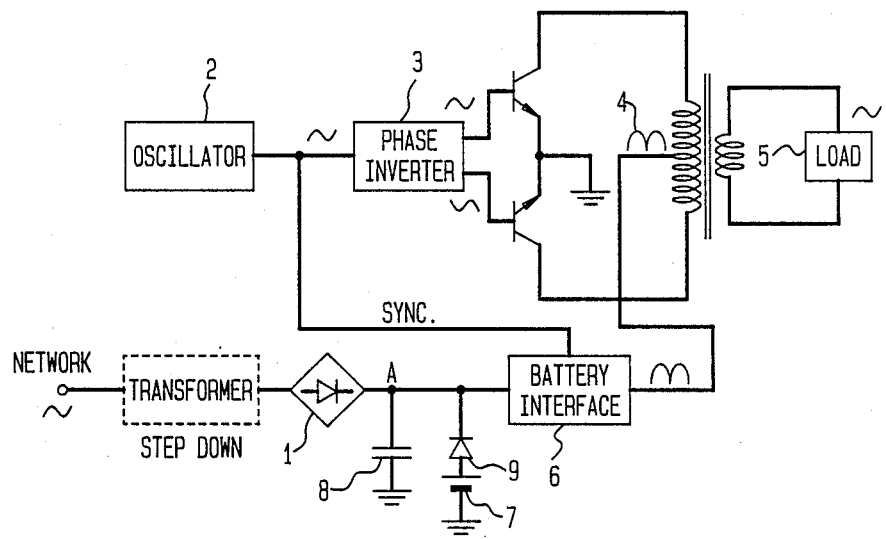
FIG. 10 shows a block diagram of an alternate embodiment of an AC stabilizer and uninterruptible power supply that incorporates the inventive output stage.

A configuration that does not suffer from the above inconvenience is given in FIG. 10. There is no need for synchronization to the network frequency, as the oscillator determines the frequency at which the system is operating. After being stepped down, the network voltage is rectified by rectifier bridge 1 and buffered by a filter capacitor 8 in order to get a smooth DC voltage with low-ripple at point A in FIG. 10. The battery voltage is connected through a diode to the same point A, which permits the battery to take over immediately when the DC voltage from the network is lower than the battery-voltage, creating an uninterruptible DC voltage at point A, which is supplied to the battery interface. This battery interface transforms the DC voltage into a bubble voltage under the control of the oscillator (see FIG. 8), which bubble voltage is supplied to the power amplifier output stage.

Here, there is no imperative need for synchronizing the bubble voltage to the network frequency, although it can be done if the load so requires. Due to the high efficiency of the PWM battery-interface—which can be 85% in practice—there is not much loss in overall efficiency in the system under normal network conditions. At high network voltage the battery bubble system has a better efficiency than the network bubble system previously described.

I claim:

1. A stabilizer for supplying stable AC voltage to a load from a source of incoming AC voltage, said stabilizer comprising:
   an output stage, operative in response to a sinusoidal control voltage and to a network bubble voltage, for providing said stable AC voltage, said output stage having at least two output transistors connected in a push-pull configuration through coupling means to a load and powered by the network bubble voltage;
   means for full-wave rectifying an incoming AC voltage to produce said network bubble voltage; and
   means responsive to said incoming AC voltage for producing said control voltage such that said control voltage is phase-locked to said incoming AC voltage in order that the voltage appearing between the collector and emitter of each of said transistors is phase-locked to and synchronous in frequency with said network bubble voltage whereby a relatively low amount of power is dissipated by each of said transistors.

2. The stabilizer in claim 1 wherein the coupling means comprises: a transformer having a center-tapped primary winding and a secondary winding, each end of said primary winding being connected to a corresponding terminal of each of said output transistors and the center tap being connected to a network bubble voltage, and said load being connected across said secondary winding.

3. The stabilizer in claim 1 wherein the producing means comprises a phase-locked loop, having a sine-wave oscillator and responsive to the frequency of said incoming AC voltage, for generating said sinusoidal control voltage.

4. The stabilizer in claim 3 further comprising: a battery interface circuit, having a battery and being connected through a switching device to said output stage, for providing battery bubble voltage to said output stage in lieu of said network bubble voltage whenever the amplitude of said incoming AC voltage decreases below a predetermined level whereby the stabilizer functions as an uninterruptible power supply.

5. The stabilizer in claim 4 wherein said battery interface circuit further comprises:
   means for rectifying a sinusoidal voltage produced by said oscillator;
   a pulse width modulator, responsive to the sinusoidal voltage produced by said oscillator and to the voltage produced, by said battery for producing a pulse width modulated voltage; and
   means for integrating said pulse width modulated voltage to produce a source of full-wave rectified voltage and applying this full-wave rectified voltage as said battery bubble voltage.

6. The stabilizer in claim 5 wherein said output stage further comprises a phase inverter, responsive to said sinusoidal control voltage, for providing in-phase and out-of-phase sinusoidal control signals, each of said in-phase and out-of-phase sinusoidal control signals being applied as a respective input signal to a corresponding base of one of said output transistors.

7. The stabilizer in claim 6 wherein the coupling means comprises: a transformer having a center-tapped primary winding and a secondary winding, each end of said primary winding being connected to a corresponding terminal of each of said output transistors and the center tap being connected to said network bubble voltage, and said load being connected across said secondary winding.

8. A stabilizer for supplying stable AC voltage to a load from a source of incoming AC voltage, said stabilizer comprising:
   means for producing a DC voltage from said incoming AC voltage;
   a sine-wave oscillator for producing a sinusoidal control voltage;
   a pulse width modulator, responsive to the sinusoidal control voltage and to said DC voltage, for producing a pulse width modulated DC voltage;
   an output stage, operative in response to the sinusoidal control voltage and to a feeding bubble voltage, for providing said stable AC voltage, said output stage having at least two output transistors connected in a push-pull configuration through coupling means to a load and powered by the feeding bubble voltage; and
   means for integrating said pulse width modulated DC voltage to produce a source of full-wave rectified voltage and applying this rectified voltage as said feeding bubble voltage to said output stage, whereby said feeding bubble voltage is phase-locked and synchronous with said control voltage thereby substantially reducing the amount of power dissipated by each of said transistors.

9. The stabilizer in claim 8 further comprising: a battery, connected through a switching device, for providing battery voltage to said pulse width modulator whenever the amplitude of said DC voltage decreases below a predetermined level, whereby the stabilizer functions as an uninterruptible power supply.

10. The stabilizer in claim 9 wherein said output stage further comprises a phase inverter, responsive to said sinusoidal control voltage, for providing in-phase and out-of-phase sinusoidal control signals, each of said in-phase and out-of-phase sinusoidal control signals being applied as a respective input signal to a base of a corresponding one of said output transistors.

11. The stabilizer in claim 10 wherein the coupling means comprises: a transformer having a center-tapped primary winding and a secondary winding, each end of said primary winding being connected to a corresponding terminal of each of said output transistors and the center tap being connected to said network bubble voltage, and said load being connected across said secondary winding.

12. The stabilizer in claim 11 wherein the switching device is a diode.

* * * * *